(12) United States Patent
Israelson

(10) Patent No.: US 11,118,548 B2
(45) Date of Patent: Sep. 14, 2021

(54) VAPOR SEPARATOR WITH THERMOELECTRIC HEAT EXCHANGER

(71) Applicant: Walbro LLC, Tucson, AZ (US)

(72) Inventor: Kevin L. Israelson, Cass City, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 16/778,277

(22) Filed: Jan. 31, 2020

(65) Prior Publication Data

US 2020/0256293 A1 Aug. 13, 2020

Related U.S. Application Data

(60) Provisional application No. 62/802,796, filed on Feb. 8, 2019.

(51) Int. Cl.
| | | |
|---|---|---|
| *F02M 37/00* | (2006.01) | |
| *F02M 37/20* | (2006.01) | |
| *F02M 25/08* | (2006.01) | |
| *F02M 31/20* | (2006.01) |

(52) U.S. Cl.
CPC ...... *F02M 37/007* (2013.01); *F02M 25/0854* (2013.01); *F02M 31/20* (2013.01); *F02M 37/20* (2013.01)

(58) Field of Classification Search
CPC .. F02M 37/007; F02M 37/20; F02M 25/0854; F02M 31/20
See application file for complete search history.

(56) References Cited

U.S. PATENT DOCUMENTS

| | | | |
|---|---|---|---|
| 6,581,579 B1 | 6/2003 | Knight et al. | |
| 6,607,361 B1 | 8/2003 | Kotter et al. | |
| 6,634,341 B2* | 10/2003 | Crary | F16K 17/36 123/516 |
| 7,827,970 B2* | 11/2010 | Smith | F02M 37/20 123/509 |
| 2004/0231648 A1* | 11/2004 | Katayama | F02M 25/089 123/541 |
| 2017/0234244 A1* | 8/2017 | Hamad | F02B 63/04 123/2 |
| 2017/0234276 A1* | 8/2017 | Hamad | F02D 19/0671 123/2 |

* cited by examiner

*Primary Examiner* — Xiao En Mo
(74) *Attorney, Agent, or Firm* — Reising Ethington P.C.

(57) ABSTRACT

In at least some implementations, a fuel vapor separator for an internal combustion engine includes a main body at least partially defining a chamber for holding fuel, a lid carried by the main body to close the chamber and at least partially define a vapor chamber above a level of fuel in the chamber, and a thermoelectric heat exchanger coupled to the main body. In at least some implementations, the main body is a thermally conductive polymeric material that is resistant to degradation or dimensional changes, and in some implementations, the main body may be formed from a metal.

18 Claims, 2 Drawing Sheets

VAPOR SEPARATOR WITH THERMOELECTRIC HEAT EXCHANGER

REFERENCE TO RELATED APPLICATIONS

This application claims the benefit of U.S. Provisional Application Ser. No. 62/802,796 filed on Feb. 8, 2019, the entire contents of which is incorporated herein by reference in its entirety.

TECHNICAL FIELD

The present disclosure relates generally to liquid and vapor separators such as may be used in fuel systems for combustion engines.

BACKGROUND

Vapor separators are typically used to separate fuel vapor from liquid fuel in a fuel system for an internal combustion engine. A conventional vapor separator is usually connected with inlet and outlet fuel lines between a fuel tank and an engine. The vapor separator typically includes a fuel pump that receives liquid fuel from within the separator and pressurizes it for downstream delivery through fittings and hoses to a fuel rail in fluid communication with the engine. A fuel pressure regulator is typically carried by a downstream end of the fuel rail and returns excess fuel not injected into the engine from the fuel rail to the vapor separator through fittings and hoses.

Fuel entering a fuel chamber of a vapor separator from the fuel rail is often heated to high temperatures, which if not addressed, may substantially reduce the efficiency of the high-pressure fuel pump and may create excessive fuel vapors, which can lead to vapor lock within the rail or injectors and can cause the engine to run rough or stall altogether. The fuel is often heated by exposure of the fuel rail to the heat being dissipated from the nearby engine, by the heat generated from electrical solenoids of the running injectors, and/or by the energy input by the electrical high-pressure fuel pump.

SUMMARY

In at least some implementations, a fuel vapor separator for an internal combustion engine includes a main body at least partially defining a chamber for holding fuel, a lid carried by the main body to close the chamber and at least partially define a vapor chamber above a level of fuel in the chamber, and a thermoelectric heat exchanger coupled to the main body. In at least some implementations, the main body is a thermally conductive polymeric material that is resistant to degradation or dimensional changes, and in some implementations, the main body may be formed from a metal.

In at least some implementations, the heat exchanger is air cooled, liquid cooled, or both. The heat exchanger may be a Peltier device. And the heat exchanger may be disposed in thermal communication with the fuel in the chamber.

In at least some implementations, a first side of the heat exchanger is disposed proximate to the main body and a second side of the heat exchanger is farther from the main body than is the first side. The first side of the heat exchanger may be coupled to the body and is cooler than the second side when electricity of a first polarity is provided to the heat exchanger. The first side of the heat exchanger may be coupled to the body and is hotter than the second side when electricity of a second polarity is provided to the heat exchanger. In at least some implementations, a heat sink is provided in heat transfer relationship with the second side of the heat exchanger.

In at least some implementations, a heat sink is coupled to the heat exchanger. The heat sink may be air or liquid cooled.

In at least some implementations, a fuel vapor separator for an internal combustion engine includes a main body at least partially defining a chamber for holding fuel, a lid carried by the main body to close the chamber and at least partially define a vapor chamber above a level of fuel in the chamber, a thermoelectric heat exchanger coupled to the main body, and a fuel pump disposed within the main body. In at least some implementations, the fuel pump includes an electric motor.

In at least some implementations, a first side of the heat exchanger is disposed proximate to the main body and a second side of the heat exchanger is farther from the main body than is the first side. The first side of the heat exchanger may be coupled to the body and is cooler than the second side when electricity of a first polarity is provided to the heat exchanger. The first side of the heat exchanger may be coupled to the body and is hotter than the second side when electricity of a second polarity is provided to the heat exchanger. A heat sink may be arranged in heat transfer relationship with the second side of the heat exchanger.

In at least some implementations, a heat sink is coupled to the heat exchanger. The heat sink may be air or liquid cooled.

BRIEF DESCRIPTION OF THE DRAWINGS

The following detailed description of certain embodiments and best mode will be set forth with reference to the accompanying drawings, in which.

DETAILED DESCRIPTION

Figure 1:
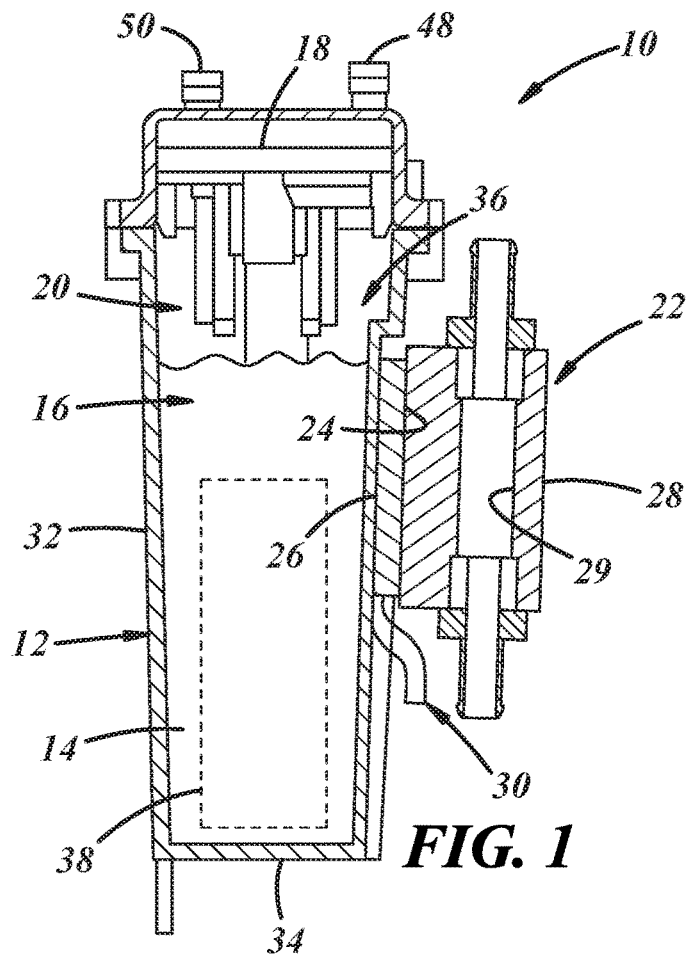
FIG. 1 is a cross-sectional view of a fuel vapor separator that includes a thermoelectric heat exchanger for facilitating heat transfer from hot fuel to a cooling liquid.

Combustion engines utilizing fuel injection systems for delivering fuel to a combustion chamber can include a fuel pump assembly having a high-pressure fuel pump and a vapor separator that acts as a fuel reservoir for supplying fuel directly to the high-pressure fuel pump. In at least some applications, the fuel pump may deliver fuel to a closed loop or recirculating fuel rail from which the fuel injectors can draw fuel.

Fuel entering a fuel chamber of a vapor separator from the fuel rail is often heated to high temperatures, which if not addressed, may substantially reduce the efficiency of the high-pressure fuel pump and may create excessive fuel vapors, which can lead to vapor lock within the rail or injectors and can cause the engine to run rough or stall altogether. The fuel is often heated by exposure of the fuel rail to the heat being dissipated from the nearby engine, by the heat generated from electrical solenoids of the running injectors, and/or by the energy input by the electrical high-pressure fuel pump. The generation of fuel vapor can become pronounced when the pressurized hot fuel flows past the pressure regulator and dumps into the vapor separator at a much lower pressure (near atmosphere). The vapor may be released through a vapor outlet passage or vent carried by the vapor separator, and the liquid fuel within the vapor separator may be cooled by a liquid coolant. The vapor outlet passage can be opened and closed by a float device, which can be actuated at higher fuel levels within the fuel chamber of the vapor separator to close the vapor outlet passage and reduce or prevent liquid fuel from entering the vapor outlet passage. A low-pressure fuel pump, which may be a diaphragm pump and is sometimes called a lift pump, provides make-up fuel to the fuel chamber to stabilize fuel levels as the high-pressure fuel pump delivers fuel from the vapor separator.

To reduce pump cavitation effects, improve fuel pump efficiency and also reduce the amount of fuel vapor within the fuel rail and/or fuel injectors that can cause vapor lock, rough engine running conditions, and/or stalling of the engine, fuel entering the high pressure fuel pump from the vapor separator may be conditioned to reduce fuel vapor therein and reduce the tendency for the liquid fuel to vaporize. In at least some implementations, the separator includes a heat exchanger that cools the fuel via heat transfer to reduce fuel vapor within the fuel system. In at least some implementations, the heat exchanger may heat fuel that is cold, which may be desirable in, for example, a diesel fuel system.

The fuel vapor separator disclosed herein provides additional cooling and/or heating of the fuel as a thermoelectric heat exchanger effectuates an additional temperature differential over the natural temperature of the cooling system. For efficiency, the thermoelectric heat exchanger may be turned on or off as needed according to fuel temperature. In at least some implementations, a gas and/or a liquid may be used as a cooling medium for the thermoelectric heat exchanger.

Figure 2:
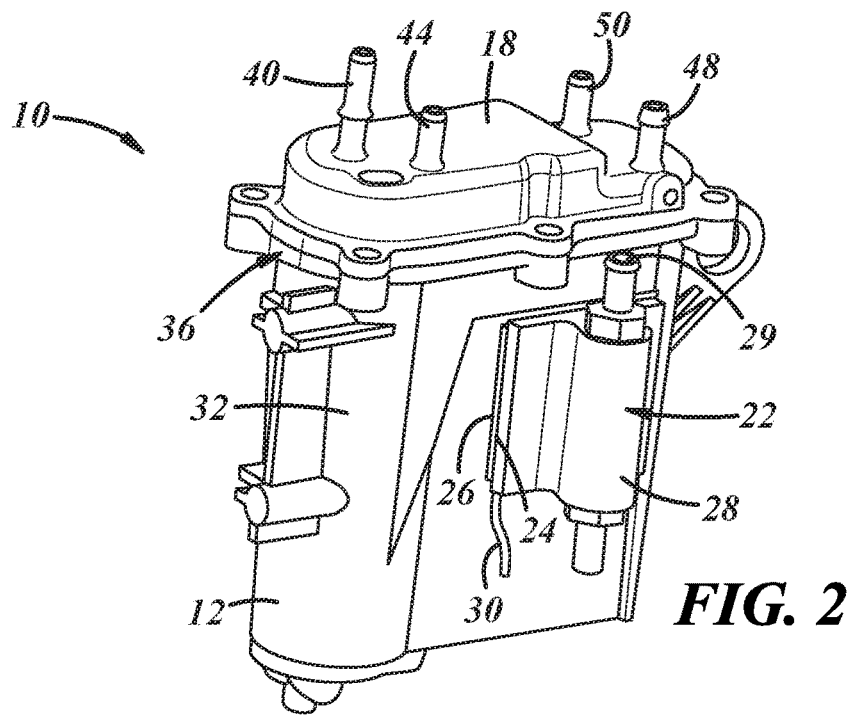
FIG. 2 is a perspective view of the fuel vapor separator of FIG. 1.

Referring in more detail to the drawings, FIGS. 1 and 2 illustrate a fuel vapor separator 10 having a main body 12 that defines at least part of an interior chamber 14 at least part of which is configured to contain fuel 16, for example, gasoline or diesel, within an internal combustion engine system for an outboard motor or any other engine-powered product. The main body 12 may be formed of a metal or polymeric material that is adapted to receive a supply of liquid fuel and provide a substantially vapor free supply of liquid fuel to the inlet of a fuel pump. The polymeric material may be thermally conductive (e.g., a polymer/composite doped with a thermally conductive material). The main body 12 may be generally bowl shaped with an open upper end 36 that may be closed by a suitable lid 18. The lid 18 may carry a vapor vent valve to facilitate venting fuel vapors from the fuel vapor separator 10 and to control the internal pressure of the fuel vapor separator 10.

In more detail, the main body 12 may include a circumferentially continuous side wall 32 of any desired shape and size. One end of the side wall 32 can be closed by a bottom wall 34 that can be integrally formed with the side wall 32. To facilitate receiving the fuel pump (shown diagrammatically at 38) among other components within the fuel vapor separator 10, the other or upper end 36 of the main body 12 can be at least partially open. The main body 12 may be formed of a metal and/or a polymeric material that is resistant to degradation or dimensional changes, for example swelling, in fuels with which the vapor separator 10 may be used. A representative, but not all inclusive or limiting, list of materials for the main body 12 includes polyamides (one example is nylon), polyphthalimides (one example is Amodel), Acetal, and the like, each of which can be glass filled if desired, and metals like aluminum or various stainless steels.

As noted above, liquid fuel 16 may be contained in a lower portion of the interior chamber 14 (relative to the direction of the force of gravity) while gaseous matter (e.g. air and fuel vapor) may rise to a vapor chamber 20 in an upper portion of the fuel vapor separator 10. To admit fuel into the interior chamber 14, the main body 12 may include a primary fuel inlet 50 through which fuel from a supply, such as a fuel tank (not shown), may flow into the interior chamber 14. To prevent the reverse flow of fuel, a valve may be provided in that flow path and may be carried by the main body 12 in a passage between the inlet 50 and the interior chamber 14. Fuel can be discharged from the interior chamber 14 through a fuel outlet 40 formed in one or both of the main body 12 and the lid 18.

The lid 18 is carried by the main body 12 and can be configured to receive, meter, and/or vent fuel vapor from the fuel vapor separator 10. As best shown in FIGS. 1 and 2, the lid 18 can generally be shaped complementary to the open upper end 36 of the main body 12 and may be coupled and sealed to the main body 12 to define the vapor chamber 20 in any desired manner, for example, using fasteners, snap-fit, clips, or the like with an o-ring, gasket or other sealing member between the body 12 and lid 18. The fuel outlet 40 can be defined in the lid 18 and can communicate with the outlet of the fuel pump 38, and fuel discharged from the fuel pump 38 is routed through the outlet 40 for delivery to the engine. The lid 18 can be formed from the same material as the main body 12, if desired, although a different material can be used including a material that is less thermally conductive than the main body 12, if desired.

The fuel pump may be carried by the fuel vapor separator 10 and may comprise an electric motor driven fuel pump having an inlet in communication with the supply of liquid fuel 16 in the interior reservoir or chamber 14 in or communicated with the main body 12 and an outlet through which pressurized fuel is discharged for delivery to an engine. The fuel pump 38 may be trapped or otherwise retained by features in both the main body 12 and the lid 18 to limit or eliminate the use of separate retainers, like clamps, screws, or bands, needed to retain the position of the fuel pump 38 within the fuel vapor separator 10. Molded-in features of the lid 18 and main body 12, along with appropriate seals, may retain the fuel pump 38 and separate the higher-pressure outlet of the fuel pump 38 from the remainder of the interior chamber 14.

The lid 18 may also carry the vapor valve through which gaseous matter may be vented from the interior chamber 14 in at least some operating conditions. For example, a valve actuator (e.g., a float that is buoyant in liquid fuel) can define or carry a valve head to move the valve head relative to a valve seat. The float may be carried by and depend from the lid 18, and may be retained in any desired manner that permits movement of the float relative to the lid 18. The vapor outlet 44 can be carried by the lid 18 and may be integrally formed with the lid 18 and include a fitting to which a hose may be fitted to route the vapor as desired. When the level of liquid fuel 16 in the interior chamber 14 is high enough to raise the float and engage the valve head with the valve seat, the vapor outlet 44 can be closed to prevent liquid fuel from escaping from the vapor outlet 44. In that position of the vent valve, gaseous matter is not vented from the interior chamber 14. At lower fuel levels, the valve head is not engaged with the valve seat and gaseous matter may flow through the valve seat and vapor outlet 44.

In at least some implementations, fuel delivered to but not consumed by the engine can be routed back to the fuel vapor separator 10 and received through a secondary fuel inlet 48. The fuel returned from the engine (hereafter, "returned fuel") is typically at a higher temperature than the fuel routed from the fuel tank and thus, may be more likely to result in vapor formation.

To cool the fuel 16 within the separator 10 and inhibit vapor formation, the fuel vapor separator 10 includes a heat exchanger. In at least some implementations, the heat exchanger includes a portion that is electrically actuated and may include a thermoelectric heat exchanger 22 (e.g., a Peltier device). The thermoelectric heat exchanger 22 can operate using the Peltier effect, where, when a DC electric current flows through the heat exchanger, heat flows from one side of the heat exchanger to the other side. The thermoelectric heat exchanger 22 can include at least two unique semiconductors placed thermally in parallel to each other and electrically in series and then two thermally conductive plates are provided with one plate on each side of the semiconductors. When a voltage is applied to the two semiconductors, the flow of DC electric current across the junction of the semiconductors causes a temperature differential at the junction. This drives a temperature differential between the two thermally conductive plates with one plate having more heat than the other plate. The plate having more heat may define or be called a hot side of the heat exchanger 22 and the plate having less heat may define or be called a cold side of the heat exchanger 22. The thermoelectric heat exchanger 22 can include a first plate/first side 26 that is proximate to and/or contacts the body 12 and a second plate/second side 24 that is distal from the body 12. When the fuel 16 is being cooled, the first plate/first side 26 can be the cold side. When the fuel 16 is heated, the first plate/first side 26 can be the hot side.

As shown in FIGS. 1 and 2, the thermoelectric heat exchanger 22 can be coupled to a side of the main body 12 and disposed proximate to and in thermal communication with the fuel 16 in the interior chamber 14 (i.e. in heat transfer relationship with the fuel so that heat may be transferred between the heat exchanger and the fuel 16 via a wall of the main body 12). The thermoelectric heat exchanger 22 can be coupled to the main body 12 in any manner, for example, using fasteners, clips, an adhesive, or the like. In at least some implementations, the first side 26 of the thermoelectric heat exchanger 22 is coupled to the main body 12, that is, at least a portion of the plate 26 is directly engaged with or otherwise in heat transfer relationship with a surface of the body 12, which may be an outer surface of sidewall 32 of the body 12, or a different wall or surface. So arranged, the second side 24 may be spaced from the main body 12 and exposed to the atmosphere. In implementations where the heat exchanger 22 is activated to cool the fuel and/or fuel vapor within the separator 10, heat from the fuel 16 within the chamber 14 may be transferred to the main body 12 and from the main body 12 to the first side 26 of the heat exchanger 22, and in turn, to the second side 24 of the heat exchanger 22.

To improve heat transfer from the second side 24 of the heat exchanger 22 and thereby improve the efficiency or performance of the heat exchanger 22, a heat sink 28 can be coupled to or otherwise provided in heat transfer relationship with the thermoelectric heat exchanger 22 (i.e. located so that heat may be transferred between the heat exchanger 22 and the heat sink 28). The heat sink 28 can include a thermally conductive material providing a greater surface area than the second side 24 by itself to absorb, remove and dissipate heat from the second side 24. One example of a thermally conductive material for the heat sink 28 is aluminum although other metals and other thermally conductive materials may be used. When the thermoelectric heat exchanger 22 is configured to cool the fuel 16, heat from the fuel 16 can move through the thermoelectric heat exchanger 22 from the fuel 16 to the heat sink 28. Heat can be removed from the heat sink 28 to a convective fluid, for example water or air. When the thermoelectric heat exchanger 22 is configured to heat the fuel 16, heat from a convective fluid may be provided to the heat sink, heat may move through the heat sink 28 to the thermoelectric heat exchanger 22, and then to the main body and to the fuel 16.

Figure 3:
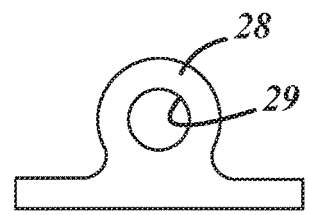
FIG. 3 is a top cross-sectional view of a portion of a heat sink of the thermoelectric heat exchanger.

As illustrated in FIGS. 1 through 3, the heat sink 28 may be connected to the second side 24 of the heat exchanger 22 and arranged for use with a liquid. In this embodiment, the convective fluid includes a liquid (e.g., water) that can be pumped or routed through a passage 29 in the heat sink 28, for example, using a water pump (not shown), corresponding plumbing, and a water supply. The moving fluid, which is often cooler than the second side 24, removes heat from the second side 24 and carries the heat away from the heat exchanger 22. Multiple passages 29 can be provided, and the passages 29 may be straight or convoluted, that is, the fluid may be routed through the passage(s) 29 in any desired way to remove heat from the heat exchanger 22. A gaseous fluid, such as air, may also be directed over an exterior surface of the heat sink 28 to further improve heat transfer, if desired. That is, the heat sink 28 may be air-cooled, liquid-cooled or both. In this regard, air or other gaseous fluid may be routed through the passage(s) 29 and liquid may be routed over the exterior of the heat sink 28, if desired.

Figure 4:
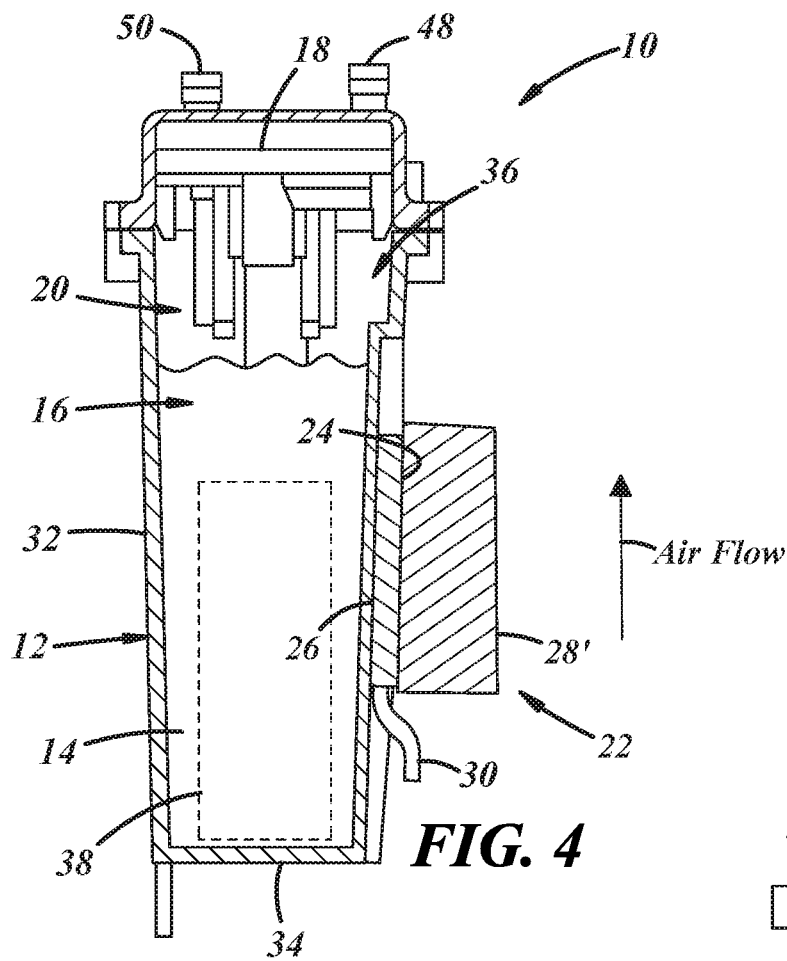
FIG. 4 is a cross-sectional view of a fuel vapor separator that includes a thermoelectric heat exchanger for facilitating heat transfer from hot fuel to cooling air.
Figure 6:
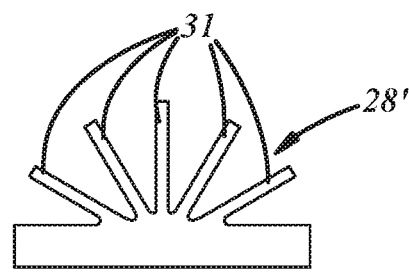
FIG. 6 is a top cross-sectional view of a portion of a heat sink of the thermoelectric heat exchanger.
Figure 5:
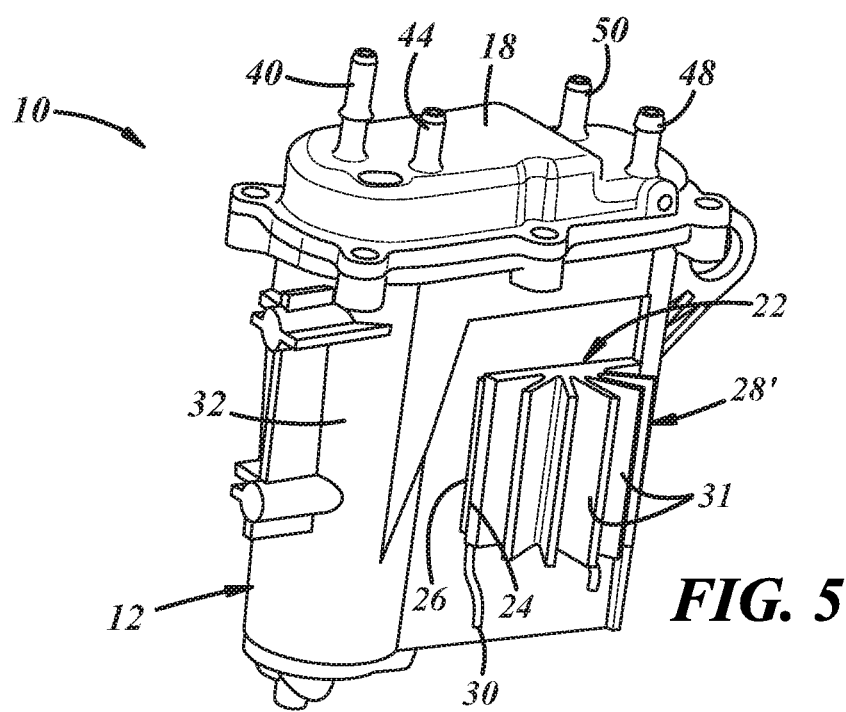
FIG. 5 is a perspective view of the fuel vapor separator of FIG. 4.

In another example and as illustrated in FIGS. 4 through 6, the heat sink 28' may be arranged for use with a gaseous fluid like air. Air can flow in contact with and away from the heat sink 28' to transfer heat from or to the heat sink 28'. The heat sink 28' may include at least one fin 31, and as shown includes a plurality of generally radial outwardly extending fins 31, that are configured to provide a large surface and heat transfer area for efficiently transferring heat to or from air in a convective manner. The fins 31 may simply reside in ambient air, or an air source may direct an air flow toward and over the fins 31, as desired. It will be appreciated that the air-cooled heat sink 28' may include other configurations suitable for transferring heat between the heat sink 28' and a gas. Of course, like the heat sink 28, the heat sink 28' may be air-cooled, liquid-cooled or both, as desired, and gaseous fluid and liquid may be routed in and/or around the heat sink 28' as desired.

When a DC current is provided to the thermoelectric heat exchanger 22 through an electrical power input 30 and having a first polarity, the first side 26 becomes cooler than the second side 24, and the first side absorbs heat from the fuel 16 in the chamber 14 via the body 12. The absorbed heat is then transferred to the second side 24 of the heat exchanger, which may be arranged to dissipate heat to the atmosphere and/or to the heat sink 28 and/or to a fluid which removes heat from the second side 24. In at least some implementations, the thermoelectric heat exchanger 22 may produce a temperature differential of up to approximately 70° C. or more between the first side 24 and the second side 26.

As noted above, the heat exchanger 22 can also be used to heat the fuel 16. When the polarity of the electricity provided to the heat exchanger 22 is reversed (e.g. electricity of a second polarity is provided to the heat exchanger 22), the direction of the temperature differential is reversed and the first side 26 of the heat exchanger would then be warmer than the second side 22. That is, the direction and polarity of the DC electric current can be switched so that the first side of the thermoelectric heat exchanger 22, which is proximate to the main body 12 and fuel 16 therein is the hot side, and the second side 24 of the thermoelectric heat exchanger 22 distal from the main body 12 and fuel 16 is the cold side. In this case, the thermoelectric heat exchanger 22 may heat the fuel 16, which may be useful, for example, in diesel fuel systems. In some instances, a plurality of thermoelectric heat exchangers 22 may be cascaded or arranged in series for additional cooling capacity, or a plurality of heat exchangers 22 may be separately coupled to different portions of the separator 10.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel vapor separator for an internal combustion engine, comprising:
   a main body at least partially defining a chamber for holding fuel;
   a lid carried by the main body to close the chamber and at least partially define a vapor chamber above a level of fuel in the chamber;
   a thermoelectric heat exchanger coupled to the main body; and
   a heat sink in thermal communication with the thermoelectric heat exchanger, the heat sink having a passage through which liquid is routed.

2. The fuel vapor separator of claim 1, wherein the main body is a thermally conductive polymeric material that is resistant to degradation or dimensional changes.

3. The fuel vapor separator of claim 1, wherein the main body is a metal.

4. The fuel vapor separator of claim 1, wherein the heat exchanger is a Peltier device.

5. The fuel vapor separator of claim 1, wherein the heat exchanger is disposed in thermal communication with the fuel in the chamber.

6. The fuel vapor separator of claim 1, wherein a first side of the heat exchanger is disposed proximate to the main body and a second side of the heat exchanger is farther from the main body than is the first side.

7. The fuel vapor separator of claim 6, wherein the first side of the heat exchanger is coupled to the body and is cooler than the second side when electricity of a first polarity is provided to the heat exchanger.

8. The fuel vapor separator of claim 6, wherein the first side of the heat exchanger is coupled to the body and is hotter than the second side when electricity of a second polarity is provided to the heat exchanger.

9. The fuel vapor separator of claim 6 wherein the heat sink is provided in heat transfer relationship with the second side of the heat exchanger.

10. A fuel vapor separator for an internal combustion engine, comprising:
    a main body at least partially defining a chamber for holding fuel;
    a lid carried by the main body to close the chamber and at least partially define a vapor chamber above a level of fuel in the chamber;
    a thermoelectric heat exchanger coupled to the main body;
    a fuel pump disposed within the main body; and
    a heat sink in thermal communication with the thermoelectric heat exchanger, the heat sink having a passage through which liquid is routed.

11. The fuel vapor separator of claim 10, wherein the fuel pump includes an electric motor.

12. The fuel vapor separator of claim 10 wherein a first side of the heat exchanger is disposed proximate to the main body and a second side of the heat exchanger is farther from the main body than is the first side.

13. The fuel vapor separator of claim 12, wherein the first side of the heat exchanger is coupled to the body and is cooler than the second side when electricity of a first polarity is provided to the heat exchanger.

14. The fuel vapor separator of claim 12, wherein the first side of the heat exchanger is coupled to the body and is hotter than the second side when electricity of a second polarity is provided to the heat exchanger.

15. The fuel vapor separator of claim 12 wherein the heat sink is provided in heat transfer relationship with the second side of the heat exchanger.

16. A method of controlling the temperature of fuel within a fuel vapor separator, comprising the steps of:
    providing electricity having a first polarity to a thermoelectric heat exchanger coupled to the fuel vapor separator to cool fuel within the fuel vapor separator; and
    providing electricity having a second polarity to the thermoelectric heat exchanger to heat fuel within the fuel vapor separator.

17. The method of claim 16 wherein a first side of the heat exchanger is disposed proximate to a main body of the fuel vapor separator and a second side of the heat exchanger is farther from the main body than is the first side, and wherein the first side of the heat exchanger is cooler than the second side when electricity of the first polarity is provided to the heat exchanger.

18. The method of claim 16 wherein a first side of the heat exchanger is disposed proximate to a main body of the fuel vapor separator and a second side of the heat exchanger is farther from the main body than is the first side, and wherein the first side of the heat exchanger is hotter than the second side when electricity of the second polarity is provided to the heat exchanger.

* * * * *